United States Patent [19]

Hucker

[11] Patent Number: 4,689,543
[45] Date of Patent: Aug. 25, 1987

[54] FREQUENCY AND VOLTAGE CONTROL FOR INVERTER POWERED AC MOTOR

[75] Inventor: David J. Hucker, Rockford, Ill., by Alice H. Hucker, legal representative

[73] Assignee: Sundstrand Corporation, Rockford, Ill.

[21] Appl. No.: 813,996

[22] Filed: Dec. 27, 1985

[51] Int. Cl.$^4$ ............................................. H02P 5/40
[52] U.S. Cl. ..................................... 318/798; 318/806
[58] Field of Search ....................... 318/798, 806, 811; 361/31, 24

[56] References Cited

U.S. PATENT DOCUMENTS

| | | | |
|---|---|---|---|
| 3,577,052 | 5/1971 | Bauer | 318/798 |
| 3,603,856 | 9/1971 | Zalar | 318/798 |
| 3,662,247 | 5/1972 | Schieman | 318/811 |
| 3,694,718 | 9/1972 | Graf et al. | 318/811 |
| 3,704,403 | 11/1972 | Gillett | 318/811 |
| 3,860,858 | 1/1975 | Nola . | |
| 3,978,383 | 8/1976 | Carthy . | |
| 4,023,083 | 5/1977 | Plunkett . | |
| 4,041,361 | 8/1977 | Cornell . | |
| 4,057,842 | 11/1977 | Bauman et al. | 361/31 |
| 4,160,940 | 7/1979 | Wolf . | |
| 4,284,943 | 8/1981 | Rowe | 318/806 |
| 4,286,303 | 8/1981 | Genheimer et al. | 361/24 |
| 4,300,086 | 11/1981 | Cesarz et al. . | |
| 4,367,520 | 1/1983 | Muto et al. | 318/811 |
| 4,527,214 | 7/1985 | Hattori et al. | 361/24 |
| 4,542,324 | 9/1985 | Leuthen | 318/806 |

OTHER PUBLICATIONS

"Transistorized Inverters for the Control of Small Indusion Motors", Bower and Nir.
"A New Current-Source P.W.M. Inverter for Induction Motor Drive System", Kouya, Matsumoto, Mochizuki and Tanaka.

*Primary Examiner*—David Smith, Jr.
*Attorney, Agent, or Firm*—Wood, Dalton, Phillips, Mason & Rowe

[57] ABSTRACT

An induction motor is powered from a DC source through a DC to AC inverter. The inverter frequency and the AC output voltage of the inverter are controlled as a function of motor current to minimize motor starting current and to accommodate a range of DC supply voltages.

7 Claims, 5 Drawing Figures

FREQUENCY AND VOLTAGE CONTROL FOR INVERTER POWERED AC MOTOR

FIELD OF THE INVENTION

This invention relates to an AC motor powered from a DC source through an inverter.

BACKGROUND OF THE INVENTION

It is known to operate an AC motor from a DC source using a static inverter to provide AC power to the motor. Typically an induction motor is used. However, such motors have a starting current which is several times the running current. This requires that the inverter and DC source be capable of supplying the high starting current and that the motor windings be capable of conducting the current. Furthermore, the DC voltage to the inverter is ofter unregulated resulting in a variation of the AC voltage from the inverter. Compromises must be made in the motor design to achieve the required mechanical power over a range of motor voltages.

SUMMARY OF THE INVENTION

In accordance with the invention, the inverter has a variable frequency and variable voltage output. High torque, low speed, low current operation is achieved by powering the motor at a low frequency and low voltage. The motor runs at a low slip factor over a range of loads.

More particularly, it is a feature of the invention that motor current in excess of a base value provides a control signal that reduces the frequency and voltages of the inverter from maximum values.

Another feature is that both the frequency (and thus motor speed) and the voltage are controlled in accordance with motor current, achieving a constant volt-seconds per cycle condition and constant motor air gap flux density. The motor operates near maximum voltage for any speed. If this voltage is exceeded, the motor current increases and the magnetic circuits of the motor saturate. This results in a further current increase which, through the control, causes a reduction of both frequency and voltage until the system reaches a stable operating condition.

Further features and advantages of the invention will readily be apparent from the following specification and from the drawings.

Figure 1:
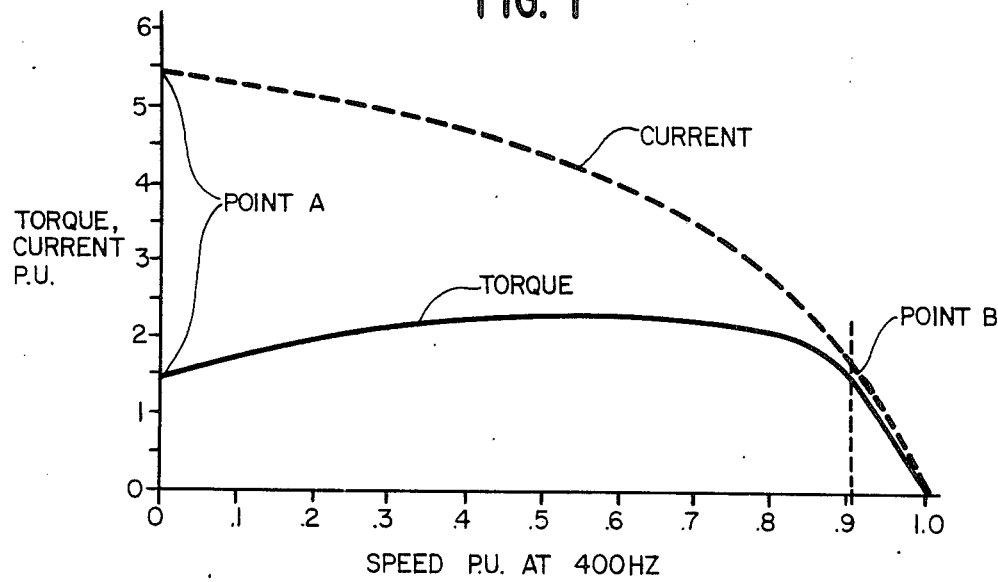
FIG. 1 is a plot of normalized curves of torque and current as a function of motor shaft speed for a typical induction motor.

The curves of FIG. 1 represent torque and current for a typical induction motor for aircraft use, plotted as functions of motor shaft speed. The scales for the ordinate and abscissa are normalized in terms of PU (per unit=rated). With the rotor blocked, point A, the motor will draw about 5.5 PU current and generate about 1.5 PU torque. The same torque may be developed at much lower current if the motor is operated at low slip, as point B. This low slip operating condition can be achieved in an inverter driven motor by reducing the frequency. If operation is avoided at rated voltage and at speeds less than about 0.85 PU, the current drawn by the motor is minimized. Both the inverter and motor may be designed for low current operation with a substantial saving in weight and cost. The current requirement for the DC source is also minimized.

Figure 2:
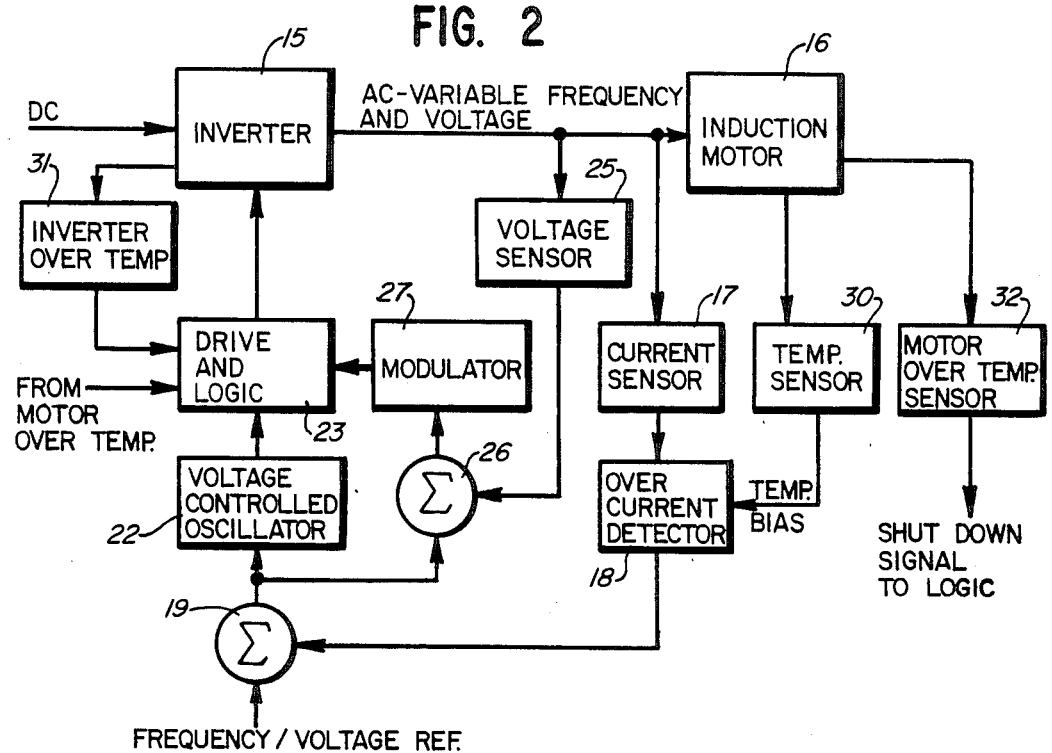
FIG. 2 is a block diagram of an inverter, motor and control illustrating the invention.

A system illustrating the invention is shown in block diagram in FIG. 2. DC power from a suitable source, as an alternator and rectifier (not shown), is connected with an inverter 15. Typically the inverter will be a three-phase circuit, but the invention is applicable to single phase motors or to motors with more than three phases. The AC output of the inverter is connected with motor 16 which may be an induction motor. The frequency of operation of inverter 15 is variable, as will appear, and the voltage is controlled by pulse width modulation of the inverter.

A current sensor 17 detects the level of current from the inverter to the motor and develops a signal which represents the current amplitude. This current signal is connected with an overcurrent detector 18 which has an output representing the sensed current in excess of a base value, which may be the steady state current of motor 16 at rated load. The excess current signal is connected with a summer 19 where it is summed with a reference signal that establishes the maximum frequency and voltage for the inverter. The inverter frequency determines the maximum motor speed and thus the slip condition for the speed at which the motor is operating.

The output of summer 19 is connected with a voltage controlled oscillator 22 which in turn provides the frequency input to drive logic and circuit 23 for inverter 15. Current sensor 17, overcurrent detector 18, summer 19 and voltage controlled oscillator 22 form a frequency control loop for inverter 15.

Voltage sensor 25 responds to the voltage output of inverter 15 and provides a voltage control signal to summer 26 where it is combined with the excess current signal from summer 19. The output of summer 26 is connected with pulse width modulator 27 which operates through drive and logic circuit 23 to control the time of conduction of the switches in the inverter 15 and thus the AC voltage of the inverter output. Voltage sensor 25, summer 26 and modulator 27 provide a second control loop for the inverter voltage. In a system where the DC input voltage to inverter 15 is stable, the voltage sensor 25 may be omitted. In this situation the excess current signal from summer 19 controls both the inverter frequency and the pulse width modulator.

In steady state operation at or below rated load for motor 16, the current does not exceed the base current and the overcurrent signal is zero. The frequency and voltage of inverter 15 are controlled by the frequency/voltage reference signal and are at a maximum.

Figure 3:
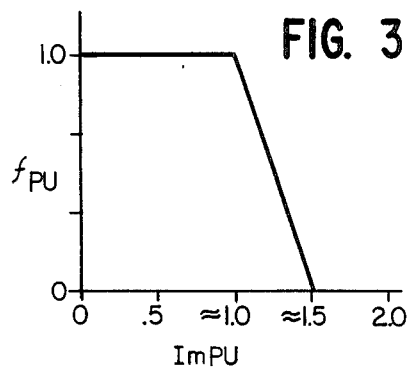
FIG. 3 is a normalized curve of inverter frequency as a function of motor current.
Figure 4:
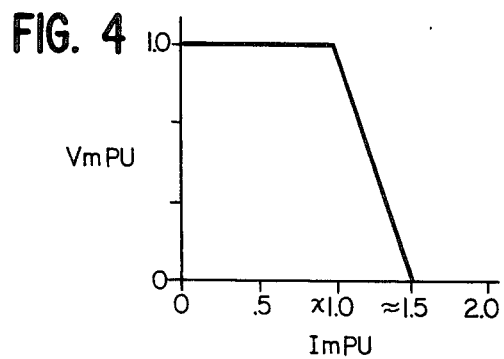
FIG. 4 is a normalized curve of motor input voltage as a function of motor current.

In case of an over-torque condition on the motor, the current drawn from inverter 15 increases. When the current exceeds the base value, overcurrent detector 18 develops an overcurrent signal which is subtracted from the reference signal at summer 19. The signal from summer 19 reduces the frequency of oscillator 22 and, through modulator 27, shortens the conduction time of the inverter switches and thus reduces the voltage output from the inverter. This operation is illustrated in the curves of FIGS. 3 and 4. FIG. 3 shows that the frequency is at its maximum value until the current is approximately 1.0 PU. When the current exceeds this value, the frequency is reduced until it approaches zero with a current of approximately 1.5 PU. Similarly, the voltage from the inverter is at a maximum with current values less than approximately 1.0 PU. With higher current the voltage is reduced and approaches zero at approximately 1.5 PU.

With an over-torque condition, the frequency and voltage are reduced until a stable operating point is reached. If the motor stalls, the inverter will supply maximum allowable current and the torque which results therefrom, at a low frequency and voltage.

At motor start the frequency and voltage command will be at a maximum. The motor current rises, resulting on a reduction of frequency and voltage. As the motor accelerates, the current decreases and the frequency and voltage increase.

The voltage loop controls the voltage to be proportional to the inverter frequency for a stable DC input. This results in a constant volt-seconds per cycle relationship and a relatively constant motor air gap flux density. With the regulation provided by voltage sensor 25, the motor design may be selected independent of concern with the DC supply variations.

A temperature sensor 30 responds to the temperature of motor 16 and provides a temperature bias input to overcurrent detector 18, reducing the base current level for operation at elevated temperatures. The reduction in the base current for the overcurrent detector 18 causes reduction of frequency and voltage at a current level less than the 1.0 PU current shown in FIGS. 3 and 4.

Additional safety circuits are provided to shut the system down in case of overtemperature conditions in the inverter 15 or motor 16. An inverter over-temperature sensor 31 and a motor over-temperature sensor 32 provide inputs to drive and logic circuit 23 blocking operation of the inverter in the event an overtemperature condition occurs.

Figure 5:
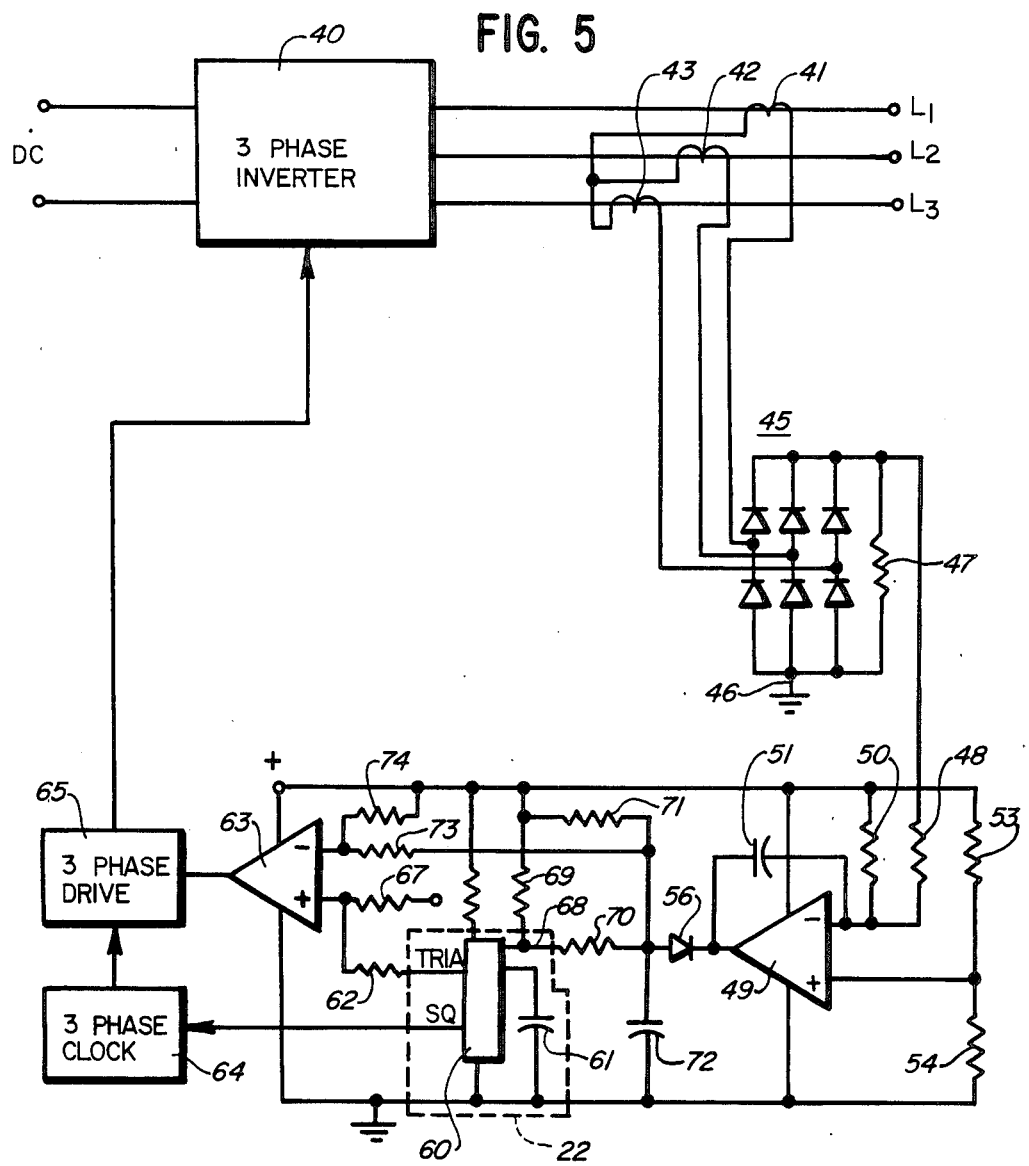
FIG. 5 is a diagram, partially in block form and partially schematic, illustrating the invention.

FIG. 5 shows a system illustrating the invention with a portion of the frequency control loop in schematic form. Some details of the system of FIG. 5 differ from the block diagram of FIG. 2, as will appear.

Three phase inverter 40 has an input from a DC source and a three phase output $L_1$, $L_2$, $L_3$ to which the motor (not shown) is connected. Three current transformers 41, 42 and 43 are associated with the three phase conductors and wye connected with a three phase full wave rectifier 45 which is returned to a ground reference 46. The output of the bridge rectifier, a measure of the average motor current, is developed across a rectifier load resistor 47. The average current signal is connected through resistor 48 with the inverting input of operational amplifier 49. Resistor 50 is connected from the inverting input of amplifier 49 with the positive DC source for the control circuit, which may be of the order of 12 volts. Resistors 50, 48 and 47 form a series voltage divider applying a positive DC bias to the inverting input of amplifier 49 in addition to the current signal from rectifier 45. A capacitor 51 connected from the output of amplifier 49 to the inverting input filters the rectified current signal. The noninverting input of amplifier 49 is connected with a voltage divider of resistors 53, 54 connected across the DC supply.

The combination of DC voltages applied to the inverting and noninverting inputs of amplifier 49 from the voltage dividers establish the base current value for the system. With no current flowing from the inverter to the motor, the voltage applied to the noninverting input is greater than that applied to the inverting input and the output of amplifier 49 is positive. Diode 56 connected with the amplifier output is back biased and blocks a current signal to the remainder of the circuitry. When the motor current increases to a value such that the signal at the inverting input of amplifier 49 exceeds the signal at the noninverting input, the output of the amplifier goes to ground potential and diode 56 conducts. The effect on the remainder of the circuit will be described below.

The voltage controlled oscillator 22 is provided by a function generator 60 with frequency selecting capacitor 61. The function generator 60 has a triangular wave form output connected through resistor 62 with the noninverting input of operational amplifier 63 which serves as the pulse width modulator for inverter 40. A square wave output from function generator 60 is connected with three phase clock 64 which provides logic gating signals to the three phase drive 65.

The noninverting input of operational amplifier 63 is connected through resistor 67 with a source of positive potential, establishing the DC level for the triangular ramp signal from function generator 60.

Function generator 60 has a voltage input terminal 68 through which the frequency of the triangular and square waves may be controlled. Terminal 68 is connected with a network of resistors 69, 70 and 71 and capacitor 72 across the DC supply.

With the output of overcurrent detector amplifier 49 positive and diode 56 reverse biased, capacitor 72 charges to the full positive potential and this voltage is applied to terminal 68 of function generator 60. The function generator operates at its maximum frequency. The voltage across capacitor 72 is also applied through resistor 73 to the inverting input of amplifier 63. Resistor 74 connects the inverting input of amplifier 63 with the positive source. The relationship of the voltage at the inverting input of the amplifier 63 to the triangular ramp signal at the noninverting input establishes the width of the pulses for phase inverter 40 and the output voltages of the inverter. With the output of overcurrent detector amplifier 49 positive, the source voltage is applied to the inverting input of PWM amplifier 63, and the inverter output is maximum.

When the current from inverter 40 to the motor exceeds the steady state or base current value, the signal at the output of amplifier 49 drops below the source value. Diode 46 conducts, partially discharging capacitor 72 and reducing the voltage both at the function generator terminal 68 and at the inverting input of PWM amplifier 63. This reduces the frequency of the function generator and thus of inverter 40 and reduces the inverter output voltage.

The circuit of FIG. 5 does not afford the temperature bias for overcurrent detector 18 nor does it have a voltage control loop for regulating voltage as in the system of FIG. 2. With a stable DC source, closed loop voltage regulation is not necessary.

The control shown in FIG. 5 is based on average current from the inverter to the motor. Peak or RMS current control might be used, depending on other circuit conditions. For example, power transistor switches are vulnerable to peak current failure. Accordingly, if the inverter uses transistor switches, the control should be based upon peak current rather than average current.

I claim:

1. In a control system for a variable speed AC motor provided with a source of excitation comprising a DC source and an inverter that supplies AC power of variable frequency and voltage to the motor, an inverter frequency and voltage control comprising:

a current sensor for developing a signal representing the current from the inverter to the motor;

an overcurrent detector connected with the current sensor, having an output signal representing the sensed current in excess of a base value;

a source of frequency and voltage reference signal;

means for summing the overcurrent detector output signal with the reference signal;

a voltage controlled oscillator coupled to the summing means for developing a triangle wave signal, the frequency of the triangle wave signal varying inversely as a function of the amount the motor current exceeds the base value;

means coupled to the summing means for developing a voltage signal, the level of the voltage signal varying inversely as a function of the amount motor current exceeds the base value; and means coupled to the voltage signal developing means and to the oscillator for comparing said triangle wave signal to said voltage signal to develop a pulse width modulated signal to control inverter frequency and voltage so that when an overcurrent condition exists voltage and frequency to the motor are reduced, to limit the maximum allowable motor current, until a stable operating point is reached.

2. The inverter frequency and voltage control of claim 1 further comprising means responsive to inverter temperature to shutdown the inverter.

3. The inverter frequency and voltage control of claim 1 further comprising means responsive to motor temperature to shutdown the inverter.

4. The inverter frequency and voltage control of claim 1 further comprising means responsive to motor temperature to reduce both frequency and voltage of the inverter.

5. The inverter frequency and voltage control of claim 1 in which the base current value of the overcurrent detector is a function of the motor temperature.

6. The inverter frequency and voltage control of claim 1 in which said oscillator operates at a maximum frequency in the absence of an overcurrent signal and the oscillator frequency is reduced by the overcurrent signal.

7. The inverter frequency and voltage control of claim 1 in which the pulse width modulator and inverter operate at maximum voltage in the absence of a overcurrent signal and the voltage is reduced by the overcurrent signal.

* * * * *

UNITED STATES PATENT AND TRADEMARK OFFICE
CERTIFICATE OF CORRECTION

PATENT NO. : 4,689,543

DATED : August 25, 1987

INVENTOR(S) : David J. Hucker

It is certified that error appears in the above-identified patent and that said Letters Patent is hereby corrected as shown below:

The inventor listing on the cover page should also include the following inventor:

"Roland W. Christen, Rockford, Illinois"

Signed and Sealed this

Twenty-seventh Day of September, 1988

Attest:

DONALD J. QUIGG

Attesting Officer     Commissioner of Patents and Trademarks